UNITED STATES PATENT OFFICE.

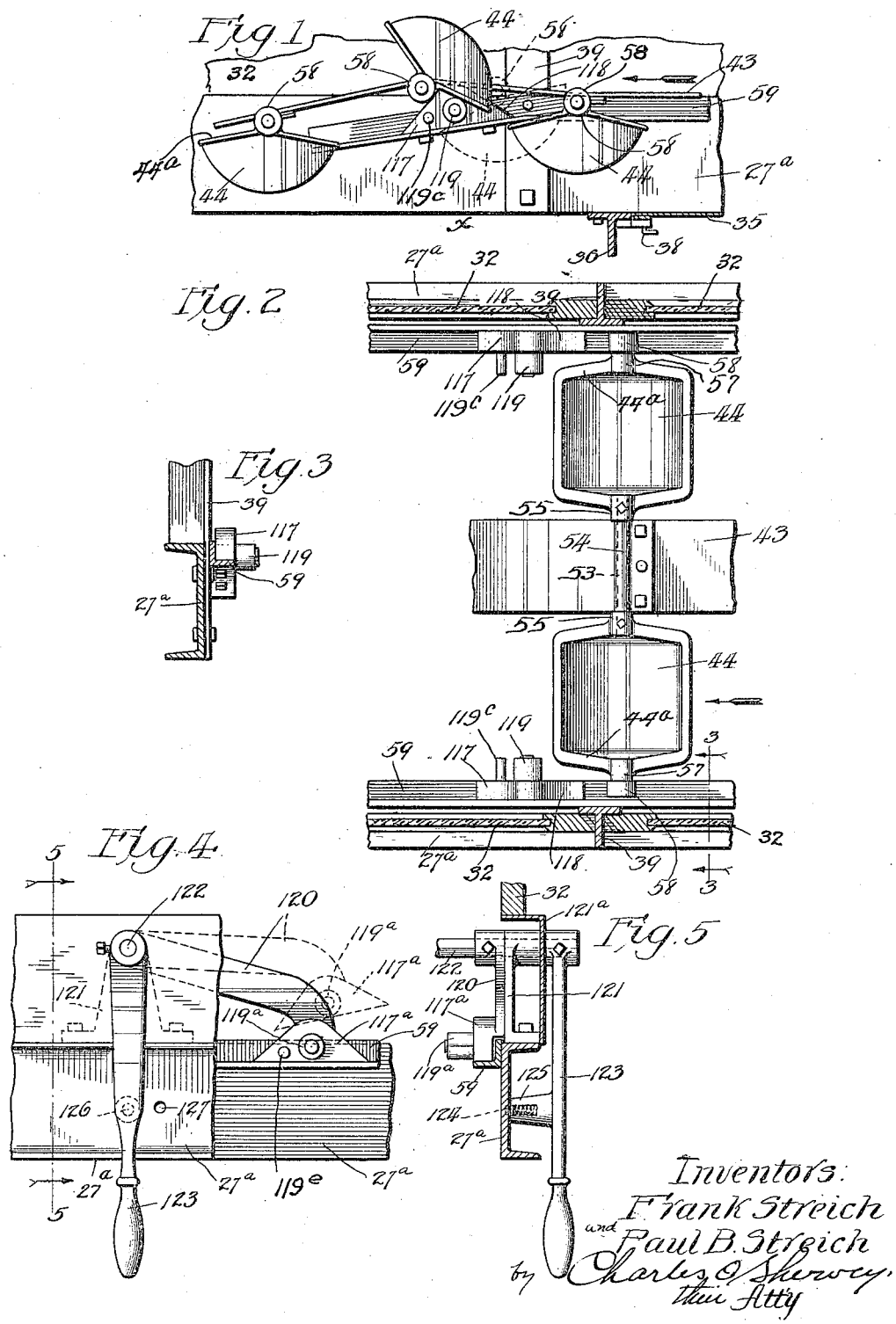

FRANK STREICH AND PAUL B. STREICH, OF JOLIET, ILLINOIS, ASSIGNORS TO THE UNION WRAPPING MACHINE COMPANY, OF JOLIET, ILLINOIS, A CORPORATION OF ILLINOIS.

BUCKET-DUMPING MECHANISM FOR CONVEYERS OF PROOFING APPARATUS.

1,322,840.  Specification of Letters Patent.  Patented Nov. 25, 1919.

Original application filed August 13, 1918, Serial No. 249,646. Divided and this application filed December 13, 1918. Serial No. 266,549.

*To all whom it may concern:*

Be it known that we, FRANK STREICH and PAUL B. STREICH, citizens of the United States, and residents of Joliet, Will county, and State of Illinois, have invented certain new and useful Improvements in Bucket-Dumping Mechanism for Conveyers of Proofing Apparatus, of which the following is declared to be a full, clear, and exact description.

This invention relates to bucket dumping mechanism for conveyers of proofing apparatus, one form of which apparatus is shown and described in our prior application for patent filed August 13, 1918, Serial No. 249,646, from which this application has been divided.

The principal objects of this invention are to provide automatic means for tilting the buckets of the conveyer at the discharge end of the apparatus; to provide automatic means for insuring the discharge of the lumps of dough from the buckets and to provide automatic dumping mechanism which may be readily made inactive, whereby the buckets may pass by the dumping mechanism without being affected thereby. With these and other objects in view, this invention consists in the several novel features hereinafter fully set forth and particularly defined in the claims.

The invention is clearly illustrated in the drawing, accompanying this specification, in which:

Figure 1, is a view partly in side elevation and partly in vertical, longitudinal section of a fragment of a proofing apparatus, containing conveyer mechanism and showing a simple embodiment of the bucket dumping mechanism, forming the subject matter of this application; Fig. 2, is a view partly in plan and partly in horizontal section of the parts seen in Fig. 1; Fig. 3, is a detail, vertical cross section taken on the line 3—3 of Fig. 2; Fig. 4, is a fragmental, side elevation, partly broken away and illustrating a modification of the invention and Fig. 5, is a vertical cross section taken on the line 5—5 of Fig. 4.

Referring to said drawing, the reference character $27^a$, designates horizontal, lengthwise extending, frame members of the proofing chamber, 39 designates upright frame members and 36 designates horizontal, transverse, frame members. The upright members 39, divide the structure into a series of panels in which are secured glazed doors 32. Bottom walls 35, are secured to the frame members $27^a$, and are in the form of doors which may be opened downwardly; they are held in closed position by locks or latches 38. A discharge opening is left at $x$, through which opening the lumps of dough are discharged from the apparatus. All of the parts thus far described are more particularly set forth in the application, above referred to.

Secured to the upright frame members 39, are horizontal parallel tracks 59, here shown in the form of angle iron bars, and said tracks support the traveling, endless conveyer. In the form of conveyer herein illustrated, dough carrying buckets 44, are employed which are arranged in pairs, and those of each pair connected by a rod 53, secured in ears 55, of the buckets. Rollers 58, are journaled on ears 57 of the buckets and travel upon the tracks 59. An endless conveyer belt 43, is employed for moving the buckets through the proofing apparatus and said conveyer belt extends between the buckets of each pair and is connected to the rods 53, by clips 54. The rods are loosely held in the clips so that the buckets are free to rotate with respect to the belt in order that they may be suspended in an upright position irrespective of the fact that the belt 43 travels around pulleys in the chamber of the proofing apparatus as is clearly set forth in our prior application.

At the discharge opening $x$, cam blocks 117 are provided, which cam blocks are shown as secured to the tracks 59, and lie in the path of travel of the rollers 58. Said cam blocks have upwardly inclined faces 118 over which the rollers travel in discharging the dough from the buckets. Extending laterally from the cam blocks 117, are projections, here shown in the form of rollers 119, that lie in the path of travel of the upper edges $44^a$ of the buckets and said rollers are so positioned with respect to the inclined faces 118 of the cam blocks as to engage said edges $44^a$, while the bucket rollers 58, travel up said inclined faces 118, thereby tilting said buckets backward far enough to invert them; and, permitting the dough to fall out of the buckets. To insure the discharge of the dough from the buckets, in case the dough sticks to the buckets, pins or other projections 119°, are secured to the cam blocks adjacent the rollers 119, which pins are positioned to be forcibly engaged by the edges 44ª of the buckets after the inverted buckets drop away from the rollers
119. In case a lump of dough clings to the bucket, the jar occasioned by the fall of the bucket upon the pin 119°, will serve to release the lump of dough from the bucket.

In the form of the invention illustrated in Figs. 4 and 5, the cam block 117ª, is movably mounted with respect to the track 59, whereby it may be moved out of the path of movement of the bucket rollers 58, and thereby may be rendered inactive. This form of the invention may be used at any place in the proofing apparatus where it is desired to discharge the lumps of dough from the buckets, before reaching the permanent bucket dumping mechanism illustrated in Figs. 1 to 3 inclusive. In said modified form, each cam block 117ª, is carried by an arm 120, which is mounted upon a rock shaft 122, journaled in bearing brackets 121, which are mounted upon the frame members 27ª. As in the preferred form, there are two cam blocks, one at each track 59, and the arms of both cam blocks are mounted upon the rock shaft 122. An operating handle 123, is mounted upon the outer end of said rock shaft and has a lug 125, which contains a spring-pressed latch 124, arranged to engage with recesses 126, 127, formed in the outer face of the side frame member 27ª. As in the preferred form, the cam blocks may be provided with pins, one of which is shown at 119°, for jarring the buckets after they have passed the rollers 119ª. In Fig. 4, the operative position of the bucket dumping mechanism is shown in full lines and when it is desired to render it inactive, the handle 123, is swung to the right until the latch engages in the recess 127, the rock shaft and both cam blocks are thereby moved to the position seen in dotted lines in Fig. 4.

In the operation of the device, the conveyer is moved in the direction indicated by the arrow in Figs. 1 and 2, and when the buckets reach the cam blocks 117, the rollers 58, travel up the inclined faces 118 of said cam blocks, as seen in dotted lines in Fig. 1, while the edges 44ª, of the buckets engage the rollers 119, which act as fulcrums over which the buckets are tilted into an inverted position as seen in Fig. 1, thereby permitting the dough to be discharged therefrom. After the buckets pass the rollers 119, they drop upon the pins 119°, and are thereby jarred sufficiently to release a lump of dough, in case it adheres to the sides or bottom of the bucket. After passing the pins 119°, the buckets resume their upright carrying position. The dough is discharged through the opening $x$, and falls upon a table, conveyer or the like, from which it is removed to the rounding up machine or other baker's machinery.

More or less variation of the exact details of construction is possible without departing from the spirit of this invention. We desire, therefore, not to limit ourselves to the exact form of the construction shown and described, but intend, in the following claims, to point out all of the invention disclosed herein.

We claim as new and desire to secure by Letters Patent:

1. In an apparatus of the class described, the combination of an endless conveyer belt, buckets on each side thereof and secured thereto, said buckets having rollers upon their outer ends, supporting tracks upon which said rollers travel, a cam block in the path of travel of said rollers and a projection on said cam block lying in the path of movement of the buckets and being directly engaged by said buckets, said projection acting to invert said buckets to thereby discharge the contents therefrom.

2. In an apparatus of the class described, an endless traveling conveyer belt, buckets pivotally secured thereto and having rollers upon their outer ends and dumping mechanism for said buckets comprising a cam block lying in the path of travel of said rollers, a projection on said cam block lying in the path of movement of the buckets and arranged to engage their upper edges to thereby tilt them as they pass said projections.

3. In an apparatus of the class described, the combination of an endless conveyer belt, buckets pivotally secured thereto and having rollers upon their outer ends, tracks upon which said rollers travel, a cam block on said track at the discharge end of the apparatus over which said rollers travel, and a roller projecting from said cam block in the path of movement of the buckets and arranged to tilt said buckets upwardly as they pass said rollers to thereby discharge the contents thereof.

4. In an apparatus of the class described, the combination of an endless conveyer belt, buckets pivotally carried thereby and having rollers upon their outer ends, tracks upon which said rollers travel, cam blocks on said tracks at the discharge end of the apparatus, said cam blocks having upwardly inclined faces over which said rollers travel, rollers mounted adjacent said inclined faces and lying in the path of movement of the buckets when traveling up said inclined faces whereby said buckets are tilted when passing by said rollers.

5. In an apparatus of the class described, the combination of an endless conveyer belt, buckets pivotally secured thereto and having rollers upon their outer ends, tracks upon which said rollers travel, means lying in the path of travel of the buckets and arranged to invert them as they pass by and means for jarring said buckets while inverted after they pass the bucket inverting means.

6. In an apparatus of the class described, the combination of an endless traveling conveyer belt, buckets pivotally carried thereby and having rollers upon their outer ends, tracks upon which said rollers travel, cam blocks at the discharge end of the apparatus having inclined faces over which said rollers of the buckets travel, projections on said cam blocks for engaging the buckets to thereby invert them as they pass by said projections and other projections adjacent the first mentioned projections with which the buckets forcibly contact after leaving the first mentioned projections, substantially as and for the purpose specified.

7. In an apparatus of the class described, the combination of an endless conveyer belt, buckets secured thereto and having rollers upon their outer ends, tracks upon which said rollers travel, and movably mounted bucket tilting means having a roller for engaging the upper edges of the buckets and having a handle whereby said means may be moved from active to inactive position.

8. In an apparatus of the class described, the combination of an endless conveyer belt, buckets pivotally secured thereto and having rollers upon their outer ends, tracks over which said rollers travel, a pivotally supported cam block having a roller projecting therefrom, and a handle for moving said cam block into active or inactive position, said cam block having a cam face over which the rollers of the buckets travel when in active position, the roller on the cam block lying in the path of movement of the buckets and acting to tilt them upon their pivotal supports.

FRANK STREICH.
PAUL B. STREICH.